Figure 1:
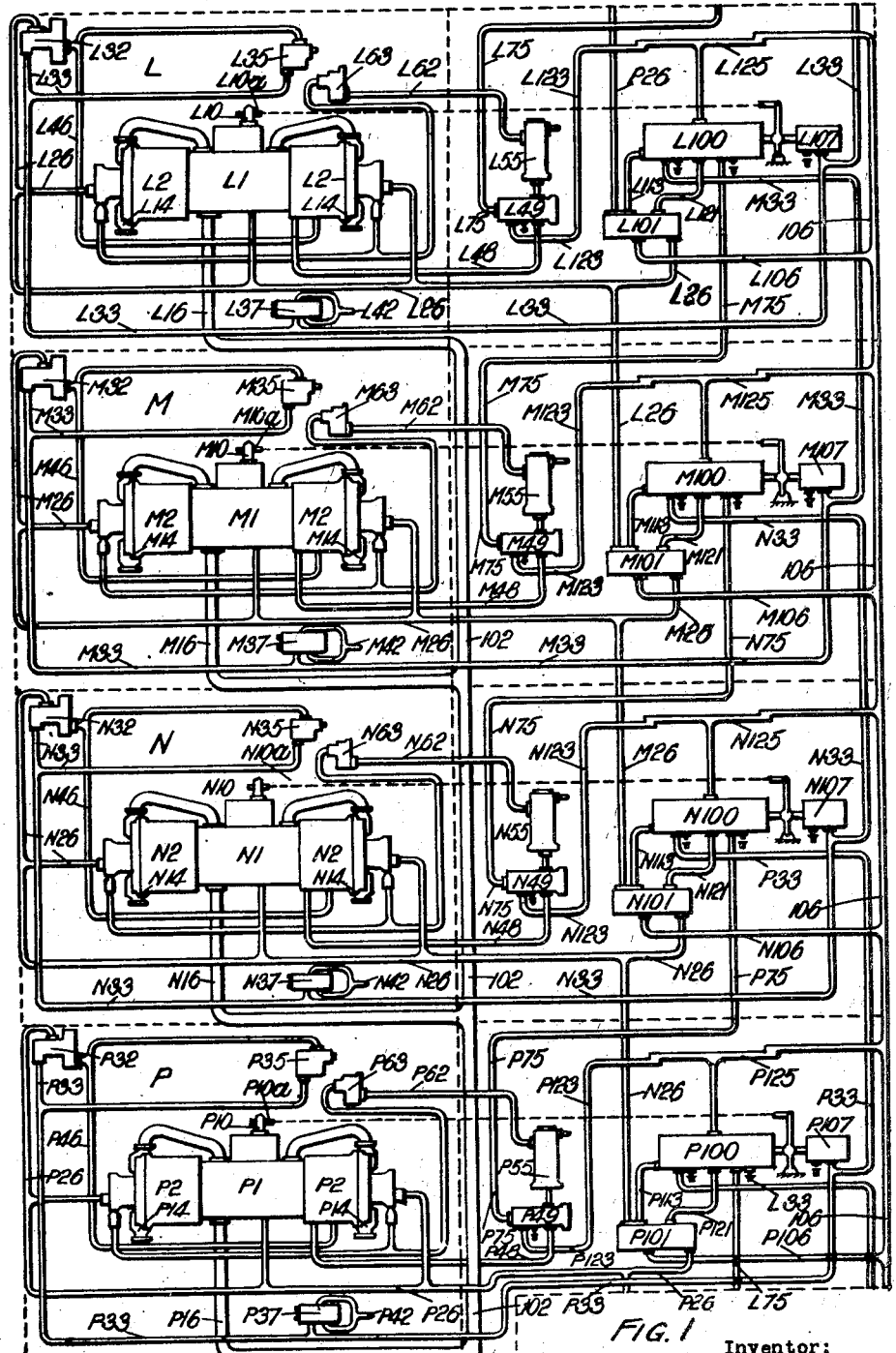

Inventor:
Robert J. Welsh
by Richard E. Babcock
Attorney

July 8, 1947.  R. J. WELSH  2,423,472
POWER PLANT OF THE FREE PISTON TYPE
Filed July 24, 1944   5 Sheets-Sheet 2
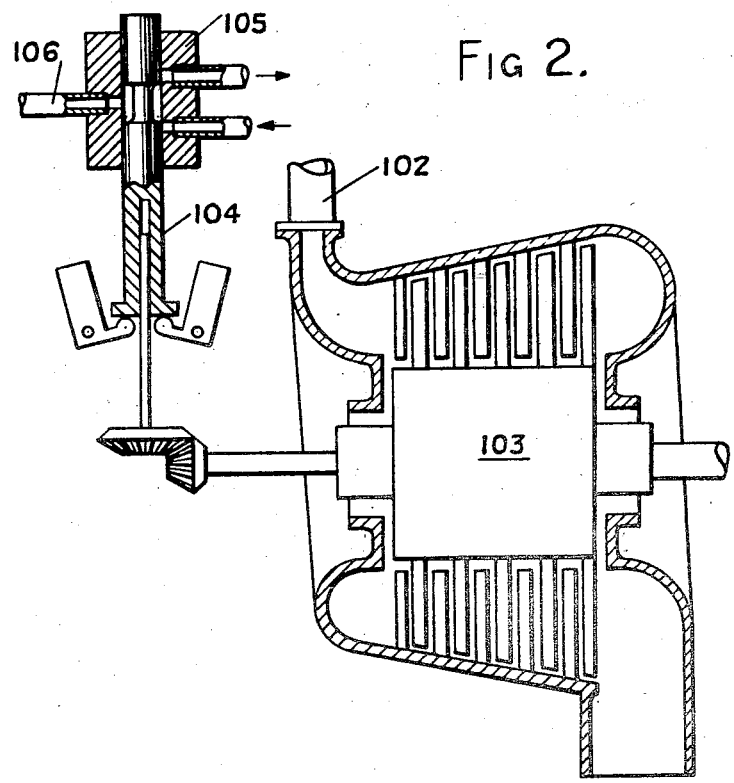
Fig 2.
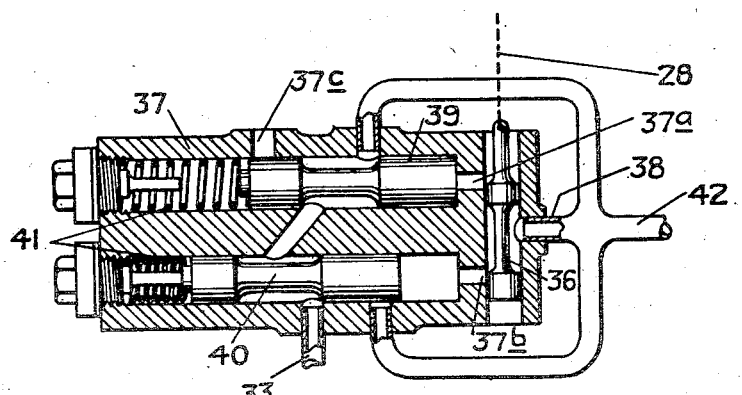
Fig. 4ª
Inventor:
Robert J. Welsh
By Richard E Babcock
Attorney July 8, 1947.   R. J. WELSH   2,423,472
POWER PLANT OF THE FREE PISTON TYPE
Filed July 24, 1944   5 Sheets-Sheet 3

Inventor:
Robert J. Welsh
By     Attorney

July 8, 1947.  R. J. WELSH  2,423,472
POWER PLANT OF THE FREE PISTON TYPE
Filed July 24, 1944  5 Sheets-Sheet 5

Inventor
ROBERT J. WELSH
By Richard E. Babcock
Attorney

Patented July 8, 1947

2,423,472

UNITED STATES PATENT OFFICE 2,423,472

POWER PLANT OF THE FREE PISTON TYPE

Robert James Welsh, Rugby, England, assignor to The English Electric Company Limited, London, England, a British company Application July 24, 1944, Serial No. 546,359
In Great Britain November 4, 1942

5 Claims. (Cl. 60—13)

1

This invention relates to the operation of a power plant made up of components of which the number in operation and their combined output is automatically varied in accordance with the load on the plant. The object of the invention is to provide simpler means than hitherto known for serving the dual purpose of determining the output of each component and controlling the starting and stopping thereof while tending to equalise the length of time during which individual components are in operation by ensuring that the components start and stop in the same cyclic order.

Thus, assuming that a plant comprises components L—M—N—P—Q—R, the minimum total load, in one mode of operation, is always supplied by component L; with progressive increase in load the output of component L is automatically increased until it reaches a certain value, component M is then brought into operation and its output progressively increased until subsequently component N is brought into operation, while on decrease of load the procedure is reversed until component M is put out of operation and component L alone remains in operation. With such a mode of operation component L may be substantially continuously acting, component R very seldom in operation and the other components acting for varying times. Accordingly, the components are preferably started and stopped in the same cyclic order. Thus, for example, if the chosen order be L—M—N—P—Q—R, then when components N—P and Q are in operation an increase of load beyond their combined capacity is met by starting component R and subsequent increases by starting component L, and so on, while a decrease in load below a predetermined value is met by the stopping or putting out of action of component N and subsequent decreases by the putting out of action of component P, and so on. The object of the present invention is to achieve the variation of power output and the desired starting and stopping in cyclic order by providing each component with its own individual control device of a simple kind whereby any desired power plant can be built up by taking the desired number of components each with its individual controlling and output-determining device and appropriately connecting these devices together and to common means for determining the total output.

Broadly the invention consists in providing each component with a servo-motor device adapted (i) to operate the output regulator for

2 the associated component, (ii) to transmit a starting signal for the next component in cyclic order when the desired output reaches a certain value or values, and (iii) to ensure on reduction of the desired output below a certain value that a component next in cyclic order either to one at rest or to the last one to start is stopped.

Figure 3:
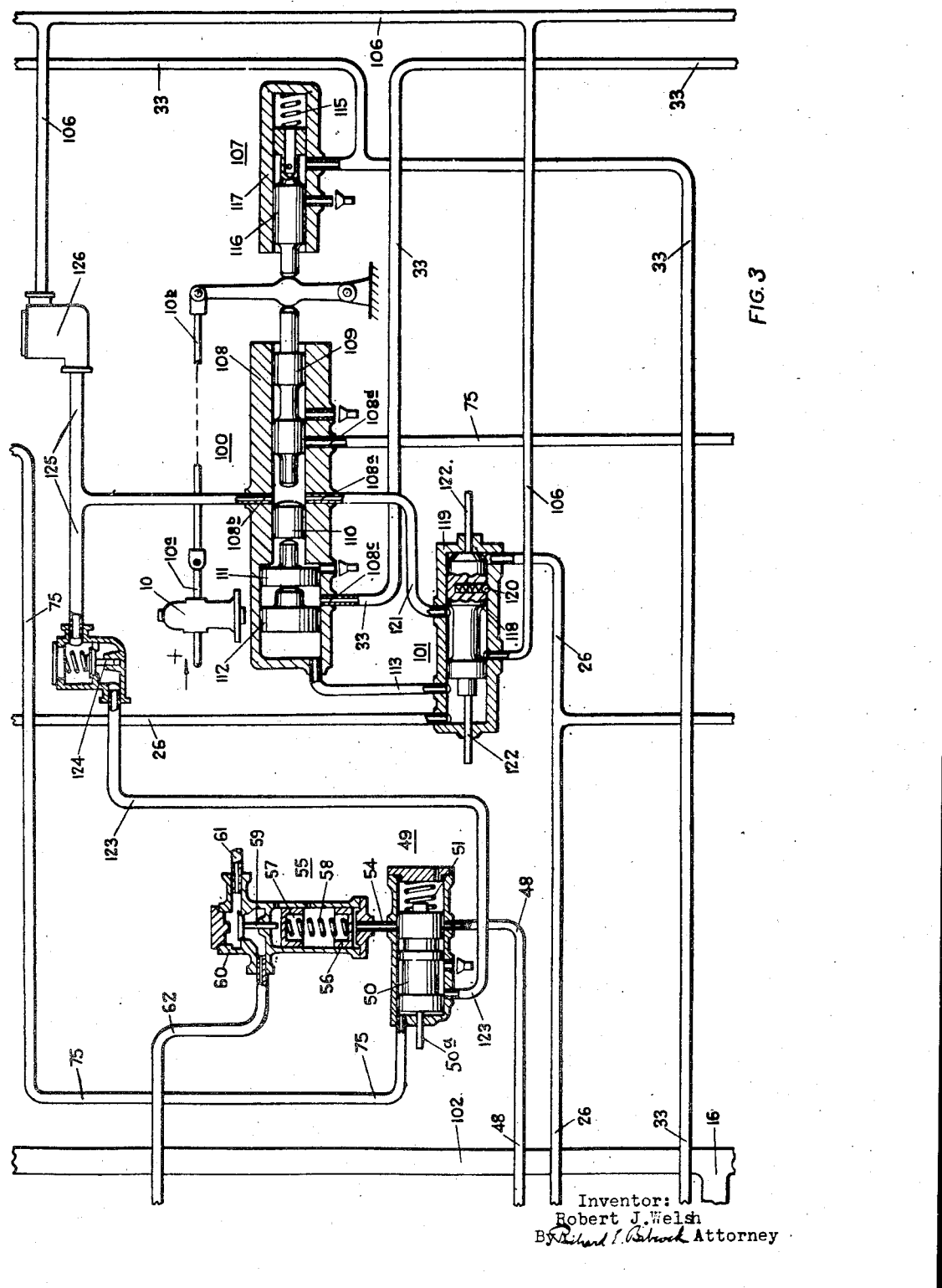
Figure 4:
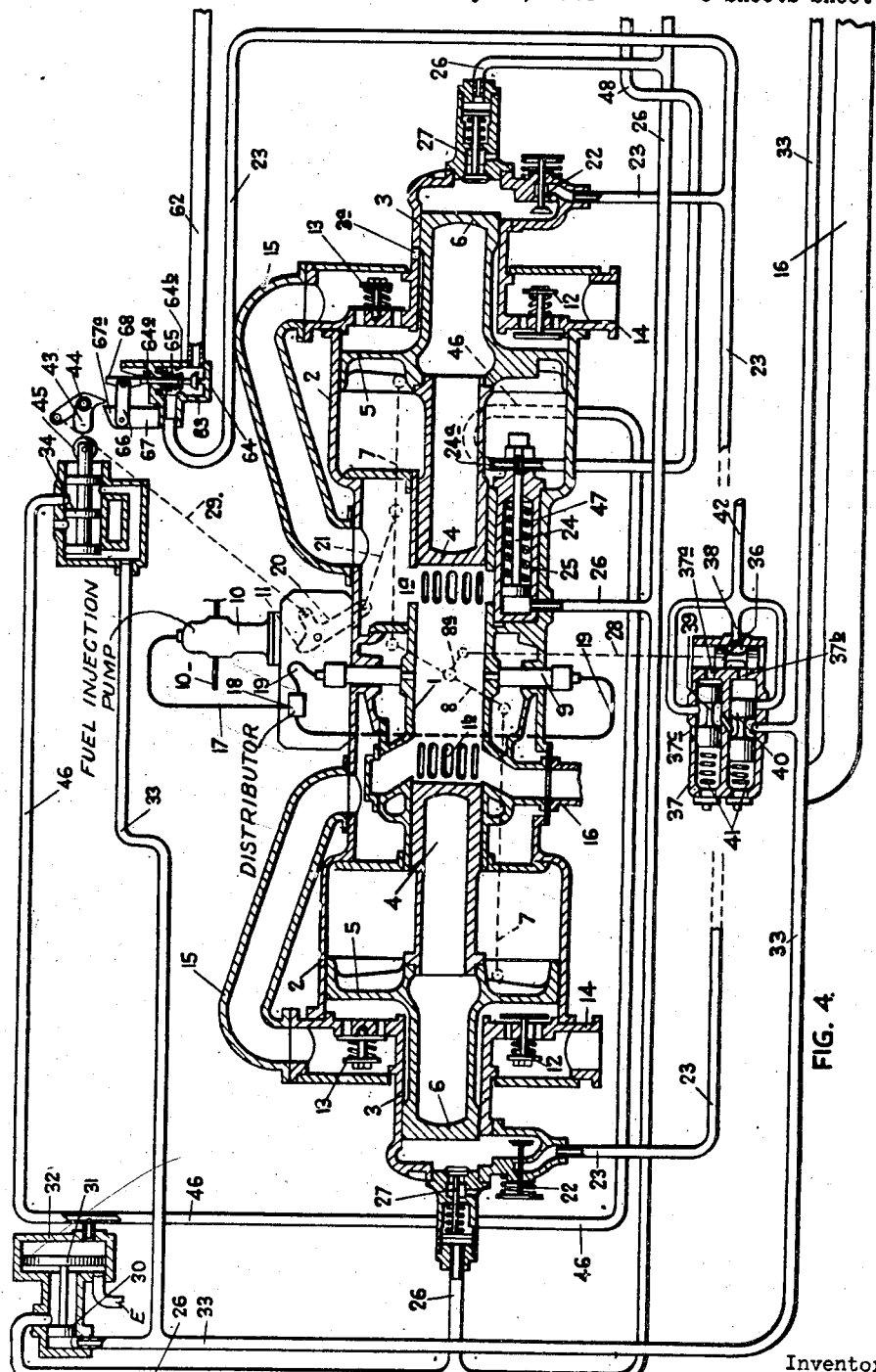
Figure 5:
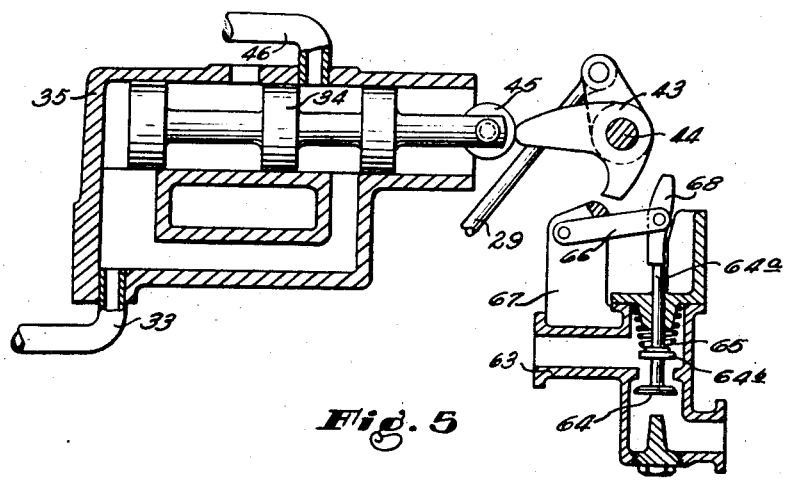
Figure 6:
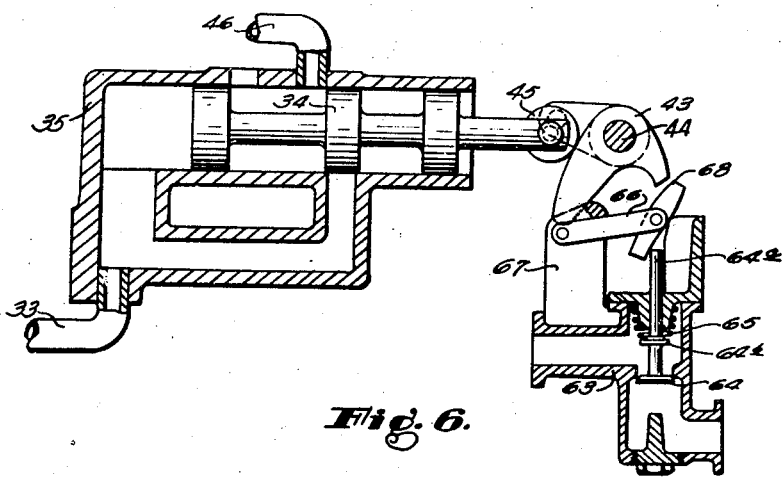

One form of complete power plant incorporating the invention is shown in outline in Figs. 1 and 2 of the accompanying drawings of which Fig. 3 is an enlarged view partly in section, of certain of the controlling parts shown in Fig. 1 associated with one of the components, while Fig. 4 is an enlarged view partly in section of one of the power components and other controlling parts associated therewith. Fig. 4a shows a detail of Figure 4 on a larger scale. Figures 5 and 6 illustrate different positions of the "timing valve."

The power components in this case are internal combustion compressors operating with liquid fuel injection, the compressors supplying a consumer, shown as a turbine, in common and the number of compressors in action and their combined output being determined automatically in accordance with the load requirements of the consumer.

The plant shown in Figs. 1 and 2 consists of four components L—M—N and P. Each of these is similar to L and is as shown in part section in Fig. 4. Referring to this figure, the body of the free piston type internal combustion compressor comprises the engine cylinder 1, the pair of compressor cylinders 2 at opposite ends thereof and the pair of buffer cylinders 3 at the extreme outer ends while each free piston unit consists of one of the opposed engine pistons 4 reciprocating in cylinder 1, a compressor piston 5 reciprocating in each of the cylinders 2 and a buffer piston 6 reciprocating in each of the cylinders 3. In the head of each compressor cylinder 2 is at least one inlet valve 12 which can put the cylinder 2 in communication with the suction inlet 14 and at least one discharge valve 13 which can put the cylinder 2 in communication with the conduits 15 communicating with the annular space surrounding the ring of inlet ports 1a in the engine cylinder 1. The rings of exhaust ports 1b in the latter open into an annular space communicating with the discharge conduit 16.

The reciprocating piston units are synchronised in well known and usual manner by being linked by the pair of links 7 to the opposite ends of the lever 8 having its mid point pivotally supported on the outside part of the engine cylinder 1.

Fuel can be injected into the cylinder 1 by fuel injectors 9 of conventional form supplied through fuel pipe 17, the usual form of distributor 18 and the fuel pipes 19 by the fuel injection pump 10 of conventional form reciprocated by cam 11 which is oscillated (in accordance with the movement of the free piston units) by the bell-crank lever 20 which is connected by link 21 to a point on one of the links 7. The quantity of fuel injected by each stroke of the injection pump 10 is determined in the usual manner by the position of the fuel rack 10a.

Each buffer cylinder 3 is provided with an opening controlled by the non-return valve 22 forming an inlet valve through which compressed air can be admitted from pipe 23 for starting the engine. In addition, each buffer cylinder has a vent governed by the compression relief valve 27 which can be opened by the application of fluid pressure from pipe 26.

A barring piston 24 movable in cylinder 25 is provided for moving the opposed piston units apart and out to the extreme outer end of their stroke on the stopping of the engine; the pistons are left in this position ready for restarting. This resetting operation is performed in response to the application of fluid pressure to the cylinder 25 through resetting control pipe 26 which, while the engine is running, is disconnected from the fluid supply and connected to exhaust; when the engine stops and so long as it is at rest, the pipe 26 is connected to the supply by the "running indicator" as hereinafter described. The resetting is controlled by a "barring relay"—comprising a valve device made up of pistons 30 and 31 movable in cylinder body 32 by the application of fluid pressure thereto from pipe 33—in co-operation with an "end of stroke indicator" comprising also a triple piston valve 34 movable in cylinder 35 also in part by the application of fluid pressure thereto from pipe 33 and partly by the action—through link 29—of the opposed engine pistons when they reach or closely approach their outer dead centre position.

The "running indicator" (Fig. 4a) is a hydraulic device comprising piston valve 36 reciprocated by the link 28 in a transverse cylinder in the body 37. In one extreme position this valve 36 connects one of two longitudinal cylinders in the same body to fluid pressure supply pipe 38 through a comparatively restricted orifice 37b and the other of said cylinders to exhaust through a similar orifice 37a; in the other extreme position the valve 36 reverses these connections while during its movement from one position to the other the valve temporarily connects both cylinders to exhaust. In each cylinder is one of a pair of double pistons 39 and 40 which, under fluid pressure through orifices 37a and 37b, can move outwards against a very light biassing force provided by springs 41. These pistons form valves which serve together to connect the pipe 33 to exhaust through port 37c only when applied pressure has moved both pistons out; when either is held in by the biassing force of spring 41, the pipe 33 is connected to the fluid pressure pipe 42. When the engine is at rest the control valve 36 can only be in a position in which at least one of the said cylinders of the "running indicator" is connected to exhaust and so the pipe 33 will be connected to pressure. When the engine is running and the control valve 36 is being reciprocated by the link 28 the said cylinders are connected alternately to pressure and to exhaust but they are not connected to the exhaust long enough through the restricted orifices 37a and 37b for the light biassing force of springs 41 to impart any appreciable inward movement to either piston; accordingly both pistons remain out and the pipe 33 remains connected to exhaust.

The fluid pressure in pipe 33—as soon as the engine stops—moves the piston unit 34 of the "end of stroke indicator" outward to a position in which it can be operated by motion of the free pistons and by acting on the smaller piston 30 of the "barring relay" moves this also in one direction, to allow the fluid under pressure to pass by way of pipe 26 to open the compression relief valves 27 in the buffer cylinders and also to enter the barring cylinder 25, thus causing the barring piston 24 to move outwards and drive the free pistons to their outer dead centre position. When the free pistons approach or reach their outer dead centre position a cam 43 actuated by them through link 29 and the lever 20 connected by the link 21 to the synchronising linkage, is rocked about the fixed pivot 44 to engage a roller 45 on the projecting end of the piston rod of the "end of stroke indicator," forcing the triple piston 34 inwards to the position shown in Figures 4 and 5 and thereby connecting the fluid pressure from pipe 33 by way of pipe 46 to a rear part of the barring relay, behind the piston 31 which is shown as of greater area than the front piston 30 so that the force from the rear will overcome that from the front. The latter relay is thus moved back to its normal position (as shown) to disconnect pipe 26 and the barring cylinder 25 from the pipe 33 and to connect them to the exhaust E, whereby the barring piston 24 is withdrawn by the action of a biassing force such as that of a spring 47 and the relief valves 27 in the buffer cylinders 3 can reclose. The barring piston 24, when completely withdrawn, re-establishes a connection from the pipe 33 through the "end of stroke indicator" cylinder 35, pipe 46, and ports uncovered and put into communication by the reduced portion 24a of the piston rod of the barring piston 24—to pipe 48 and a port in a "starting relay" 49 hereinafter described with reference to Figure 3. When the barring piston and cooperating parts have gone through the operations described the whole equipment is then reset and ready for restarting, the resetting having taken place automatically in immediate response to the stopping of the engine.

Referring now also to Fig. 3, the engine of each component can be started by the application of fluid pressure through pipe 75 to the cylinder of the starting relay 49; the resulting movement of the piston valve 50 therein against the force of spring 51 puts the said pipe 48 in communication through pipe 54 with the cylinder 55 of the servomotor for actuating the starting valve. Movable within cylinder 55 is a piston unit made up of parts 56 and 57 with spring 58 compressed between them; the part 57 can engage the stem of starting valve 59 which, when the valve is closed, rests on a seating in the valve casing 60. Provided that the corresponding "running indicator" is in the "rest" position, that the "end of stroke indicator" is in the position corresponding to the free pistons being in the outer dead centre position and that the barring piston is fully withdrawn, it will be clear that fluid under pressure can then pass from the supply pipe 42 through the pipes 33, 46, 48 and 54 to the cylinder 55 and so cause piston part 57 to lift the starting valve 59 off its seating. Compressed air for starting purposes from pressure pipe 61—which constitutes a source of comparatively unrestricted capacity—is hence admitted to the now closed buffer cylinders 3, by way of pipe 62, the body 63 of a "timing valve" provided for subsequently cutting off the air supply to the cylinders 3, the pipe 23 and non-return starting inlet valves 22. The piston of the master starting valve 49 has a projection 50a which allows the valve 50 to be moved to the right manually by the operator against the force of spring 51 in order to connect pipe 48 with the cylinder 55 and thus to open the compressed air valve 59 when the first engine of the plant is required to be started up.

The "timing valve" 64 has three positions in the body 63, viz: (1) closed, (2) fully open, and (3) wholly released; it is biassed to position (3)— in which it is shown in Figure 4—by a spring 65 which holds the valve considerably clear of its seating. The valve device includes a lever 66 pivotally mounted outside the valve casing on a lug 67 extending therefrom; a trigger 68 is pivotally mounted on this lever and normally positioned directly adjacent to the end of the stem 64a of valve 64, which stem projects through the valve casing 63. The lever 66 is biassed by gravity to a position in which the trigger 68 abuts against the valve stem 64a but the lever is free to make a small movement until arrested by a stop formed by the lug 67. The pressure of the air entering body 63 from pipe 62 acts on the "timing valve" 64 itself to move it (against the biassing force of spring 65) from position (3) to its position (2) or "fully open" position (Figure 5), thus allowing air to pass by pipe 23 to the buffer cylinders 3. Preferably in position (3) a collar 64b on the valve stem 64a lying within and considerably restricting the valve aperture acts to delay the building up of pressure on the discharge side of the "timing valve" thereby accelerating the opening movement of this valve while at the same time delaying the initial movement of the free pistons by delaying the building up of air pressure in the buffer cylinders. This also eliminates the risk of the free pistons moving so quickly as to be beyond the correct position for cutting off the starting air before tripping the trigger as described below. The valve stem 64a, during the movement of the valve to the open position, bears against the trigger 68 which with lever 66 thus acts as a stop. The thrust of the valve stem against the trigger is on a line passing through the pivot of the trigger which therefore does not turn about its pivot but the lever 66 moves until arrested by the stop. This movement of the valve and trigger, by which the valve moves to but is held in the fully open position, brings a part of the trigger 68 into the path of a part of the cam 43 actuated by the free pistons through link 29. As the pistons pass a certain point before reaching the inner dead centre position, the trigger 68 is accordingly engaged by cam 43 and turned about its pivot on lever 66 so that it releases the "timing valve," (Figure 6) allowing the latter under the action of the air pressure, to continue its movement to the first or closed position whereby the buffer cylinders 3 are no longer connected to the pipe 62 and the pressure pipe 61. The valve stem 64a then bears on the trigger 68 in such a way as to hold it out of the path of the cam 43 as the latter oscillates. It will be seen that the starting air supply is cut off and the "timing valve" mechanism does not interfere with subsequent normal operation of the free piston device. Subsequent reclosure of the "master starting valve" 59 (cutting off the supply of air) allows the "timing valve" to return under the action of its biassing spring 65 and together with the lever 66 and trigger 68 to the wholly disengaged position so that the trigger remains out of the path of the member adapted to engage it. The movement of the free pistons will actuate the "running indicator" to disconnect the pipe 33 from the supply pipe 42 and connect it to exhaust. Pressure is thus removed from the piston unit 34 of the "end of stroke indicator," which will accordingly remain in the withdrawn position and be unaffected by the subsequent operation of the engine, and from pipes 66, 48 and 54 so that the pistons 56 and 57 will allow the "master starting valve" 59 to reclose.

The engine of each component is stopped by cutting off the fuel supply—i. e. by moving the fuel rack 10a which controls the fuel supply and power output to the position in which the fuel pump 10 delivers no fuel. This fuel pump, as indicated in Fig. 1 by the chain-dotted line extending from the fuel-rack 10a, is mechanically linked to and hence actuated by one of the fluid pressure servo-motors L100, M100, etc. which is also mechanically connected to and acted on by one of the counter-pressure devices L107, M107, etc. Also associated with the servo-motor is the throw-over valve device such as L101, M101, etc.

Similar parts associated with each of the components are indicated in Fig. 1 by the same reference numerals but with the distinguishing prefixes L, M, N or P, these prefixes being omitted in Figs. 3 and 4.

The exhaust pipes L16, M16, etc. all discharge into the common supply conduit 102 going to the inlet to the turbine 103 shown in Fig. 2. The speed governor 104 of the turbine actuates the usual valve device 105 to connect the control pipe 106 to fluid pressure on a decrease in speed below 106 to fluid pressure on a decrease in speed below and to exhaust on an increase in speed above a predetermined value.

Fig. 3 shows the fuel pump 10 for any of the components, also in longitudinal section the servo-motor device 100 actuating the rack 10a, the counter-pressure device 107 acting on the servo-motor and the associated throw-over valve device 101. The servo-motor comprises a cylinder 108 in which a piston 109 operating the fuel-rack 10a is moved forward by fluid under pressure from the control pipe 106 through the throw-over valve. Backward movement of the piston 109 is limited by a releasable stop 110 associated with a stop piston 111 (of larger effective area than the piston 109) movable in an extension of the cylinder 108. The stop piston 111 can be held in its right-hand position by fluid pressure admitted through pipe 113; this may act as shown through a further piston 112 for a purpose explained hereinafter. Movement of piston 109 to increase the quantity of fuel injected is opposed by biassing spring 115 and can be opposed also by a counter-pressure piston 116 movable in the cylinder 117 of the device 107 by fluid under pressure through the pipe 33 from the associated running-indicator 37 when the associated power component is at rest.

The throw-over device 101 consists of piston 118 movable from one end to the other of cylinder 119 under fluid pressure from one or other of the pipes 26. As already explained, pressure is applied through pipe 26 momentarily, and in response to the stopping of the component, to the barring device for resetting the pistons. Pipe L26 from component L goes to the right-hand end of device L101 and to the left-hand end of device M101, the pipes M26, etc., being similarly connected (see Fig. 1). Thus the valve 118 has pressure applied to it for a brief period immediately after its associated engine is stopped, tending to move it to the left, to a closed position; an equal and opposite pressure tending to move it to the right—i. e. to the open position in which it connects the control pipe 106 through pipe 121 to port 108a in cylinder 108 is applied for a brief period immediately after the preceding engine in cyclic order is stopped. When no pressure is applied thereto, the valve 118 stays in whichever position it has been previously set, and may be lightly retained in position by spring-pressed ball catch 120. Thus the first component to start will have its throw-over valve device 101 in the open position and the others should have their throw-over valve devices 101 in the closed position. The valves 118 will have automatically been left in suitable positions as a result of the functioning of the plant during its preceding period of operation and by the stopping of the last engine at the end of that period. Alternatively the throw-over valves 118 may be set manually by the projecting piston rods 122 with any desired engine arranged as the first to start. The initial start is obtained by moving the rod 50a of the device 49 to the right by hand as described. Starting of subsequent engines in cyclic order has no effect on the throw-over valve devices 101 but stopping of the first engine causes its throw-over valve 118 to be moved to the closed position while that associated with the next engine is moved to the open position.

When for example only the one component L is running, the control pipe 106 is connected through device L101 directly to the associated servo-motor L100. On a momentary decrease in turbine speed the turbine governor valve 105 connects fluid pressure to the control pipe 106 whereby the piston 109 of servo-motor L100 is moved to the right to increase the output of engine L1. This continues progressively until this particular piston 109 uncovers a port 108d in the cylinder 108, putting the control pipe 106 (through pipe 121) in communication with the pipe M75 going to the starting relay M49 for the component M. Movement of this relay connects fluid pressure from pipe M48 to the servo-motor which opens master starting valve M55 to start the engine M1. The movement of any starting relay 49 (such as M49) also allows the pressure fluid to pass through it by way of pipe 123 and non-return valve 124 to the port 108b in the associated servo-motor cylinder and act on the piston 109—e. g. for M. Since the throw-over valve device M101 is in the closed position, there will be no connection from the control pipe through this valve to the servo-motor cylinder for M but control pipe 106 is in communication, through pipe 113, with the cylinder extension so that pressure holds the stop piston 111 and the stop 110 in their forward position whereby the servo-motor piston 109 for M is held in a position to adjust the fuel pump to supply a certain small quantity of fuel to engine M1, which should accordingly immediately start. It is possible that through leakage in the system while the engine is at rest there may be an accumulation of fluid in the cylinder 108 which might tend to adjust the fuel pump 10 to supply more fuel than desirable for starting; to overcome this difficulty the cylinder 117 of the associated counter-pressure device 107 receives fluid pressure through pipe 33 from the associated running indicator while the engine is at rest, which pressure acts on the counter piston to oppose movement of the piston 109 and of the rack 10a beyond a predetermined position corresponding to the maximum quantity of fuel it is desired to supply when starting.

The starting of engine M1 will cause pressure to be removed from the counter pressure device M107 and there may accordingly be an immediate tendency for the associated piston 109 to move and increase the fuel supply to the engine M1. The starting of the latter will, however, probably immediately result in the combined output of the two components L and M being more than sufficient to meet the load requirements of the turbine 103 which will accordingly increase in speed sufficiently for the turbine governor to connect the control pipe to exhaust. The servo-motor piston 109 of device L100 can clearly then move backwards under the action of the associated biassing spring 115 to reduce the output of engine L1; thus the starting of the engine M1 will result in a reduction of the output of component L and in an immediate adjustment of their combined output to meet the load requirements of the turbine 103. If the piston 109 of device M100 has moved forward beyond the initial starting output position it will be able at once to move backward—as described below—to reduce the output of component M again and ensure the necessary adjustment of the combined output.

When the piston 109 of device L100 has moved back far enough to cover again the port 108d fluid from the cylinder 108 of device M100 cannot return to exhaust by this route, nor can it return by the throw-over valve device M101. Another pipe 125 is provided, however, by which fluid can flow from port 108b in each cylinder 108 to the control pipe 106 through a second non-return valve 126 preventing flow in the reverse direction. Thus when the pressure in the control pipe 106 falls below the pressure of fluid trapped behind the piston 109 of device M100 the associated non-return valve 126 can open to permit fluid to flow out of device M100 to permit the associated biassing spring 115 to move the rack 10a of the fuel pump M10 to reduce the output of engine M1.

Further increase in load will move the piston 109 of device L100 forward to increase the power output of the engine L1 but since the supply of pressure fluid to the cylinder 108 of device M100 is derived only through pipe M75, device M49 and pipe M123 from port 108d of device L100—which accordingly is for the time being a master control device for the whole plant—the piston 109 for engine M1 will move forward only so long as the said port 108d of the device L100 is uncovered. With further increase of load the piston 109 of device M100 will uncover its associated port 108d to bring the engine N1 into action as already described but the device L100 will still remain the master device controlling devices M100 and N100 and device 100 of any component subsequently started.

On progressive decrease of load the pistons 109 of devices L100, M100, etc., for all the engines in operation can move backward (to the left) until each engages its stop 110 but further decrease of load beyond this point will affect device L100 to a greater extent than any of the devices M100, etc., because the counter-spring 115 for this device L100 will be opposed by the pressure from the control pipe 106 acting on only the piston 109 whereas the counter-springs 115 of the devices M100, etc., will be opposed by the pressure from the control pipe 106 acting on the larger stop pistons 111 or 112. If the pistons 109 of all the devices 100 are engaging their stops 110 and stop pistons then when next the governor valve 105 connects the control pipe 106 to exhaust, the counter-spring 115 acting on piston 109 of device L100 can move that piston (together with the associated stop 110 and stop piston 111) backward to move the rack 10a of pump L10 to decrease still further the fuel supply to engine L1 and eventually to cut off the fuel supply and so stop engine L1. This is possible because the throw-over valve device L101 is in the open position and has cut off pipe 113 connecting the back of the associated stop piston from the pressure in the control pipe 106 and connected this pipe 113 either to exhaust or to some independent source of lower pressure. In the arrangement shown the pipe 113 from device L100 is connected to pipe P26 to which there is no pressure except momentarily on the stopping of engine P1. The pistons 109 of devices 100 for the engines subsequently brought into operation, when engine L1 is being stopped, position the corresponding racks 10a in the minimum fuel position, but they will be prevented from so great a further backward movement by their stops 110—due to fluid pressure through the pipes 113 acting on the back of each stop piston—and so only the engine L1 will stop.

The stopping of engine L1 applies fluid pressure momentarily through pipe L26 to the cylinder 119 of device L101 to move valve 118 thereof to the closed position whereby pressure from pipe 106 is re-applied through pipe 113 to the back of the associated stop piston to move the piston 109 of device L100 forward to a minimum fuel position in readiness for the restarting of engine L1. Pressure is also applied through pipe L26 to the cylinder 119 of device M101 to move valve 118 of device M101 to the open position; this connects the control pipe 106 through pipe 121 to device M100 whereby the latter becomes the master servo-motor device for the whole plant.

The associated non-return valve 124 is closed by the back pressure of the fluid in the cylinder 108 of device M100, which pressure accordingly cannot affect the associated starting relay M49 or pass back through pipe L75 to the port 108d in the cylinder 108 of the device L100. To guard against any risk of slight leakage past the non-return valve 124 the starting relay 49 may be arranged so that in the idle position, as shown in Fig. 3, the pipe 123 is connected to drain. This same non-return valve 124 can fulfill another important function, as described below.

A further feature of the invention allows the starting signal, from each component to the next, to be transmitted when the output of the component is still some fraction below its maximum while at the same time ensuring that, if more than one component is in operation, all components other than the last to start will reach full output before a starting signal is transmitted to any further components. To achieve this result each of the non-return valves 124 is loaded, so as to act as a reducing valve whereby when the controlling fluid is flowing from the device 100 for one component through the associated valve 124 to that for the next component and so on, its pressure will be less in each successive servo-motor device 100. Thus, the loading of all the reducing valves 124 is sufficient to ensure that the piston 109 of any device such as L100 will move the associated rack 10a into the full output position before the piston 109 of the next device M100 uncovers the port 108d in its cylinder.

Thus it will be seen that the arrangement controls the output of the whole plant in accordance with the load on the turbine 105 and ensures both starting and stopping of individual components in the same cyclic order. During the operation, the fuel pumps 10 for the various engines will not necessarily be all similarly adjusted but at certain times will—as an inherent feature of the operation of the arrangement—be adjusted to different outputs. The engines will thus not necessarily operate all at the same output—assuming that they are identical and consequently have the same maximum output. The arrangement may be such that under most conditions all the engines except one are working under approximately optimum conditions. An additional feature of the invention assisting towards the maintenance of as many engines as possible at or near their full load consists of the provision of a small leak from each servo-motor cylinder. With the plant running under steady load conditions this leak will result in a tendency for the output of all the components in action to fall slowly. This fall in output will be corrected by the governor valve 105 admitting more pressure fluid to the control pipe 106 but this additional fluid will act on the devices 100 and hence on the engines in cyclic order so that under the final steady conditions that one of the components in action which is last in cyclic order may be operating on part load whilst all other components in operation are operating at full load. Alternatively the last component in cyclic order may be at "minimum" load (i. e. with the servo-motor piston against the stop), the next engine to it may be operating on some greater fraction of full load whilst all other engines in operation are operating at or near full load.

According to a further feature of the invention, reduction of load is effective to stop an engine only if the next engine in cyclic order is running; this ensures that when only one engine is running this engine can be stopped, and the plant completely shut down, only by the action of an attendant. To this end pressure is also applied to each stop piston device while the next engine in cyclic order is at rest—which pressure can conveniently come from the signal pipe 33 controlled by the running indicator of the next engine. Thus, as shown, the stop piston is in two separate parts 111 and 112, the former having a projection bearing against the back of the stop 110 and the rear part 112 having a projection bearing against the back of the part 111; a port 108c in the cylinder extension between these parts 111 and 112 is connected to one of the signal pipes 33 while the back of the cylinder extension can be connected—as already described—to the associated throw-over device 101. The device L100 is connected to pipe M33, device M100 to N33 and so on. The stop 110 itself is shown as an independent piston located in the cylinder 108 between the forward projection from part 111 of the stop piston device and a rearward projection from the piston 109. A leak is shown at the front end of the cylinder extension for draining off any fluid leaking from the servo-motor cylinder.

The number of components of the plant may be more than is necessary to deal with the maximum load on the plant so that there will always be at least one engine at rest serving as a standby and this will allow at least one engine to be shut down for inspection and repair at any time, while leaving the plant capable of dealing if necessary with the maximum load.

What I claim as my invention and desire to secure by Letters Patent is:

1. Power plant of the kind including a prime mover, a speed governor actuated thereby, a governor-valve device actuated by said governor, and a plurality of internal-combustion compressors supplying motive gas in common to said prime mover, in combination with fluid-pressure type means for controlling the output of said internal-combustion-compressors and for starting and stopping them successively in the same cyclic order, which means comprise, for each of said internal combustion compressors, (i) a starting device, (ii) a fuel-supply regulator—having a "stop" (i. e. "no-fuel") position—a maximum fuel position and a range of intermediate positions, (iii) a fluid-pressure type servo-motor in driving connection with said fuel regulator, (iv) supply pipes from said governor-actuated valve to said servo-motor, (v) a pipe connection to the starting device for the next internal-combustion-compressor in the said cyclic order from a port in said servo-motor positioned to be uncovered when servo-motor and fuel regulator are in an intermediate position, (vi) a movable stop of said servo-motor retained by fluid pressure in position to obstruct movement of said servo-motor and fuel-regulator to the "no-fuel" position, and (vii) a throwover control valve in the fluid pressure connection to said movable stop.

2. Power plant according to claim 1 including a non-return valve in the pipe between said port in the servo-motor and the said starting device of the next compressor in cyclic order.

3. Power plant according to claim 1 including, for each said internal-combustion-compressor a running-indicator actuated thereby and operative connections between said throw-over valve and firstly the running-indicator for the associated internal-combustion compressor and secondly the running-indicator for the preceding compressor in cyclic order, the connections being in such a sense that the throw-over valve device is movable in response to the stopping of the preceding compressor in cyclic order to take up a position in which it connects the associated servo-motor device to a fluid pressure supply pipe controlled by said governor actuated valve and to take up a position interrupting that connection in response to the stopping of the associated compressor whereby the said connection to the supply pipe controlled by the governor actuated valve is established only for that one of the compressors in action which is first in cyclic order.

4. Power plant according to claim 1 including for each said compressor a running-indicator actuated thereby, a further arresting member in co-operation with the said arresting member, and a fluid-pressure connection established to the latter by the said running indicator of the next internal-combustion-compressor in the said cyclic order when this next compressor is at rest and accordingly the associated internal-combustion-compressor is the only one running.

5. Power plant of the kind including a prime mover, a speed governor actuated thereby and a plurality of internal combustion compressors supplying motive gas in common to said prime mover including, for each of the said internal-combustion-compressors (i) a combination of a fuel-supply regulator—having a "stop" (i. e. "no fuel") position—with an actuating servo-motor therefor under the control of said governor, (ii) a pressure-reducing valve controlling the supply to said servo-motor independently of those associated with the other internal-combustion-compressors, (iii) a movable stop on said servo-motor retained by fluid pressure in position to obstruct movement of said servo-motor and fuel regulator to the no-fuel position and (iv) a throw-over valve in the fluid pressure connection to said movable stop.

ROBERT JAMES WELSH.

REFERENCES CITED

The following references are of record in the file of this patent:

UNITED STATES PATENTS

| Number | Name | Date |
| --- | --- | --- |
| 2,237,082 | Pateras-Pescara | Apr. 1, 1941 |
| 2,306,978 | Pateras-Pescara | Dec. 29, 1942 |

FOREIGN PATENTS

| Number | Country | Date |
| --- | --- | --- |
| 439,666 | Great Britain | Dec. 11, 1935 |
| 183,759 | Switzerland | July 16, 1936 |